UNITED STATES PATENT OFFICE.

NATHANIEL HAYWARD, OF COLCHESTER, CONNECTICUT.

PROCESS OF PREPARING ELASTIC INDIA-RUBBER CLOTH.

Specification forming part of Letters Patent No. 14,811, dated May 6, 1856.

*To all whom it may concern:*

Be it known that I, NATHANIEL HAYWARD, of Colchester, in the county of New London and State of Connecticut, have invented and produced an Improved Elastic Cloth; and I do hereby declare that the following description is a full and exact specification of the same, wherein I have set forth the nature and principles of my said new invention or production by which my improved article of manufacture may be distinguished from all others of a similar character, together with such points as I claim and desire to have secured to me by Letters Patent.

The elastic cloth which is now and has heretofore been made has been either woven with elastic threads or produced by stretching india-rubber threads, cords, or narrow bands between two strips of cloth of the desired width, having their inner faces cemented. The several parts are then compressed together, after which the india-rubber threads are allowed to contract, and by carrying the cloth with them it becomes finely corrugated, as it were, and the elastic fabric is produced. The fabric thus produced lacks durability, as the india-rubber threads, cords, or narrow bands are liable to break, which of course destroys the elastic character of the material, and in all cases neither the elasticity nor strength of the cloth so formed is uniform. "Shirred" goods, as they are called when thus made, are also objected to by manufacturers, because the fabric is uneven, owing to the difference of thickness where the threads of rubber are found and where they are absent. In my improved elastic cloth these defects are obviated and a much higher degree of elasticity produced by using sheets of vulcanized rubber of the same width with the cloth to be made elastic, and cementing them by a new process which I have discovered, and for which I have made an application for Letters Patent bearing even date herewith. Until the invention of this improved process of cementing the several parts, those skilled in the art of manufacturing elastic cloth have found it impracticable to cement anything but threads, cords, or narrow bands to the surfaces of cloth, and the firmly cementing and uniting the sheets of rubber as wide as the cloth to be made elastic with the sheets of cloth constitutes the novel feature of my improved manufacture. In fact, the ordinary shirred goods owe their union to the cementing of the two surfaces of cloth between the threads of rubber, and not to the cementing of the threads of rubber to the cloth.

My improved elastic cloth is produced in the following manner: The india-rubber compound which is to form the main body or principal part of the sheet is prepared to be vulcanized in the usual manner well known to manufacturers of vulcanized rubber. This compound is rolled into sheets of the requisite thickness, which sheets vary in thickness according to the required thickness and strength of the fabric. Both surfaces of this sheet are then coated with a very thin sheet of native rubber compounded with vulcanizing ingredients in such a manner that it will not vulcanize at the same degree of heat with the main body of the sheet.

There are various modes in which the thin coatings of rubber to be applied to the central sheet can be prepared, so that they will not vulcanize at the same degree of heat with the central sheet itself, and the fact that different compounds vulcanize at different degrees of heat is well known to manufacturers of rubber goods. One of these various modes I will describe. Suppose that the central sheet is made of the following composition, which is a good one for the purpose—viz., one pound of rubber, one-half pound of litharge, one-quarter of a pound of plaster-of-paris, and two ounces of sulphur. Then, for the composition of the thin sheets which are to be applied to the surface of the central sheet, and which are not to vulcanize so soon, I would take one pound of rubber, one-half pound of white lead, one-quarter of a pound of whiting, and one ounce of sulphur. The first compound would vulcanize thoroughly at 265° or 270° Fahrenheit, and the other would require from 10° to 15° higher heat. The compositions used are so different that it is impossible to describe all, or to specify what changes are necessary in all cases; but as a general rule it may be stated that sulphur is the indispensable vulcanizing agent used in all cases. By increasing the quantity of sulphur the compound vulcanizes more thoroughly and at a lower degree of heat, and by changing the proportions of sulphur materially all the usual compounds can be made to vulcanize at higher or lower degrees of heat. There are other substances, also, which have an effect upon the vulcanizing process. Thus I substitute, in the example above given, white lead and whiting for litharge and plaster-of-paris, as the two latter facilitate the process more than the two former. Something depends upon the quality of the rubber; something, too, upon the quality of the ingredients combined, and although it is by no means difficult for a manufacturer who is using the same ingredients and under the same circumstances to vary the proportions so as to produce a change in the degree of heat which is to be applied to produce vulcanization, it is difficult to be more precise in the instructions for accomplishing that object. These two thin sheets may be applied to the surfaces of the central sheet in the form of dissolved rubber, or in a pasty state spread on by rolls, or with a knife-coating machine in any of the modes generally practiced. The whole sheet is then submitted to the usual vulcanizing process, and the result is that the central part is vulcanized, and the two thin sheets on the top and bottom thereof are not vulcanized. The sheet of rubber thus prepared is then stretched to double its length, or further, if desired. The cloth to be combined with this sheet of rubber on both sides is prepared by spreading upon it a thin coating of rubber compounded in a state to be vulcanized, which is spread and prepared in the usual manner. The two sheets of cloth are then applied to the rubber sheet in a state of tension, as before described, either by hand or by machinery, the rubber side of each strip of cloth being applied to and pressed upon the sides of the rubber sheet. The tension being then taken from the rubber sheet, the fabric is exposed to heat, for the purpose of vulcanizing the thin coatings of rubber placed upon the cloth. The result is that a fabric is produced in which the cloth is thoroughly combined with the rubber in such a manner that it cannot be separated without the use of great force. In preparing this fabric the central sheet of rubber may be vulcanized before the two thin coatings of rubber above mentioned are spread upon it; but in this case it is necessary that the sheet so formed should be then submitted to heat between 220° and 250° of Fahrenheit in order that these thin coatings may be partially vulcanized, after which the process of manufacture is as above described.

It is not absolutely essential that after the cloth has been coated and applied to the rubber the whole fabric shall be revulcanized.

Having thus described my improved elastic cloth, I wish it distinctly understood that I do not claim the elastic fabrics usually denominated "shirred goods," and made of threads or strips of rubber combined with cloth; nor do I claim what are commonly called "woven elastic goods;" nor do I claim the mere union of cloth with india-rubber, for this has been done in various ways without producing an elastic fabric; but

What I claim as my invention, and desire to have secured to me by Letters Patent, is—

The producing an elastic fiber of uniform strength by uniting a sheet of rubber with sheets of cloth thinly coated on one side with a vulcanizable compound of rubber, the sheet of rubber, before it is united with the sheets of cloth, being, in the modes substantially as above set forth, so prepared that the central part of it is completely vulcanized, while the surfaces are not.

NATHANIEL HAYWARD.

Witnesses:
EZRA LINCOLN,
L. A. SNEDEN.